US012469962B2

(12) United States Patent
Jackson

(10) Patent No.: US 12,469,962 B2
(45) Date of Patent: Nov. 11, 2025

(54) DEPLOYABLE SUPPORT STRUCTURE FOR SPACE-BASED SATELLITE ANTENNAS

(71) Applicant: Flexitech LLC, Orlando, FL (US)

(72) Inventor: Kevin Jackson, Orlando, FL (US)

(73) Assignee: Flexitech LLC, Orlando, FL (US)

( * ) Notice: Subject to any disclaimer, the term of this patent is extended or adjusted under 35 U.S.C. 154(b) by 168 days.

(21) Appl. No.: 18/243,245

(22) Filed: Sep. 7, 2023

(65) Prior Publication Data

US 2024/0079764 A1 Mar. 7, 2024

Related U.S. Application Data

(60) Provisional application No. 63/374,765, filed on Sep. 7, 2022.

(51) Int. Cl.
*H01Q 1/28* (2006.01)
*H01Q 1/08* (2006.01)
*H01Q 1/12* (2006.01)
*H01Q 11/08* (2006.01)

(52) U.S. Cl.
CPC ............... *H01Q 1/288* (2013.01); *H01Q 1/08* (2013.01); *H01Q 1/1235* (2013.01); *H01Q 11/086* (2013.01)

(58) Field of Classification Search
CPC ............ H01Q 1/08; H01Q 1/288; H01Q 1/28; H01Q 1/1235; H01Q 1/085; H01Q 1/087; H01Q 1/1228; H01Q 19/04; H01Q 11/086
See application file for complete search history.

(56) References Cited

U.S. PATENT DOCUMENTS 3,579,244 A * 5/1971 Dempsey ................. H01Q 1/08 343/890
3,611,652 A * 10/1971 Rabenhorst et al. . E04H 12/185 52/110
3,665,478 A * 5/1972 Dempsey ................ H01Q 5/40 343/846
3,836,979 A * 9/1974 Kurland ............... H01Q 11/086 343/895
3,906,509 A * 9/1975 DuHamel .............. H01Q 1/362 343/895
4,068,238 A * 1/1978 Acker .................. H01Q 11/086 343/895
4,608,571 A * 8/1986 Luly .................... H01Q 15/161 343/915

(Continued)

*Primary Examiner* — Ab Salam Alkassim, Jr.
(74) *Attorney, Agent, or Firm* — John L. DeAngelis; Wolter Van Dyke Davis, Pllc

(57) ABSTRACT

A support structure for space-based antennas. The structure includes a boom and core and spacer boards disposed along a length of the boom. The boom extends through an opening in each board. Antenna elements are attached to core boards. A top board is rotatably affixed to a first end of the boom and a bottom board affixed to a base surface of a stow tube in which all the elements are stored prior to deployment. A material of the antenna elements comprises a flexible material, allowing the elements to be stowed in a restricted volume of the stow tube prior to deployment into an operational configuration. Tension cords, disposed longitudinally along the boom and attached to each one of the core and spacer boards, are tensioned after deployment to ensure the core boards and the antenna elements thereon are spaced apart as required.

20 Claims, 10 Drawing Sheets

(56) References Cited

U.S. PATENT DOCUMENTS

| | | | | | |
|---|---|---|---|---|---|
| 4,780,727 | A * | 10/1988 | Seal | H01Q 11/086 | D14/234 |
| 4,918,884 | A * | 4/1990 | Okazaki | E04H 12/185 | 52/646 |
| 4,977,408 | A * | 12/1990 | Harper | H01Q 11/10 | 343/876 |
| 5,196,858 | A * | 3/1993 | Reed | H01Q 1/08 | 343/900 |
| 5,214,439 | A * | 5/1993 | Reed | H01Q 11/10 | 343/792.5 |
| 5,593,129 | A * | 1/1997 | Adams | F16M 11/18 | 248/405 |
| 5,721,558 | A * | 2/1998 | Holemans | H01Q 11/086 | 343/895 |
| 5,909,197 | A * | 6/1999 | Heinemann | H01Q 1/288 | 343/895 |
| 5,977,932 | A * | 11/1999 | Robinson | H01Q 1/288 | 343/895 |
| 6,046,706 | A * | 4/2000 | Vargas | H01Q 1/1235 | 343/903 |
| 6,237,241 | B1 * | 5/2001 | Aaron | H01Q 1/1207 | 33/613 |
| 7,694,465 | B2 | 4/2010 | Pryor | | |
| 8,191,322 | B2 * | 6/2012 | Liestenfeltz | H01Q 1/1235 | 52/118 |
| 8,893,442 | B1 | 11/2014 | Spence et al. | | |
| 8,970,447 | B2 | 3/2015 | Ochao et al. | | |
| 9,406,995 | B2 * | 8/2016 | Murphy | H01Q 1/1235 | |
| 10,059,471 | B2 | 8/2018 | Steele et al. | | |
| 10,347,974 | B1 | 7/2019 | Palmer et al. | | |
| 10,367,246 | B2 | 7/2019 | Rudys et al. | | |
| 10,611,502 | B2 * | 4/2020 | Hensley | H01Q 1/1235 | |
| 10,892,545 | B1 * | 1/2021 | Parsche | H01Q 1/12 | |
| 11,303,033 | B1 * | 4/2022 | Bamford | H01Q 3/12 | |
| 12,040,542 | B2 * | 7/2024 | Gaudette | H01Q 11/086 | |
| 2018/0331433 | A1 * | 11/2018 | Ceely | H01Q 11/10 | |
| 2019/0103650 | A1 | 4/2019 | Daton-Lovett | | |
| 2019/0277051 | A1 * | 9/2019 | Reveles | E04H 12/187 | |
| 2022/0289406 | A1 * | 9/2022 | Mchale | E04C 3/005 | |
| 2022/0297855 | A1 * | 9/2022 | Li | B64G 1/2222 | |
| 2022/0344794 | A1 * | 10/2022 | Ruhl | H01Q 1/288 | |
| 2022/0407235 | A1 * | 12/2022 | Gaudette | H01Q 11/086 | |

* cited by examiner

DEPLOYABLE SUPPORT STRUCTURE FOR SPACE-BASED SATELLITE ANTENNAS

CROSS REFERENCE TO RELATED APPLICATIONS

The present invention claims priority under 35 U.S.C. 119(e) to the provisional patent application filed on Sep. 7, 2022 and assigned application No. 63/374,765. This provisional patent application is incorporated in its entirety herein.

BACKGROUND OF THE INVENTION

Satellites require facilities to send and receive radio communications to provide critical command and control signals to and from the spacecraft while in orbit. Additional radio communications receivers and transmitters support the satellite's mission to provide a communications link to or from the ground stations, to and from other spacecraft, and to and from space-based and ground-based sensors. Many of the antennas needed for these applications are large structures comprising one or multiple elements.

Many of the satellites being developed today are small, but require large antennas to support their mission. These antennas are too large for implementing as fixed structures on the satellite at launch, and therefore must be stowed for launch and then later deployed while in orbit.

BRIEF DESCRIPTION OF THE FIGURES

The present invention can be more easily understood and the advantages and uses thereof more readily apparent when the detailed description of the present invention is read in conjunction with the figures wherein.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Ideally, to meet the launch and in orbit constraints, the stowed antenna must be stowable in a compact configuration and subsequently expandable in orbit by activating a deployment process. Additionally, the deployed antenna must be self-supporting and sufficiently rigid to support the properly-spaced antenna elements and/or sensor elements.

The present invention utilizes a uniquely inventive deployable boom to deploy multiple antenna elements and supporting components from a stowed condition upon reaching orbit. Core boards affixed to the boom support antenna elements, sensors, and associated electronic or electrical components for space applications. Using the design methodology and resulting embodiments described herein, antennas of many types and sizes, including very large antennas, can be assembled on the ground, stowed for launch, and deployed in orbit.

Figure 1:
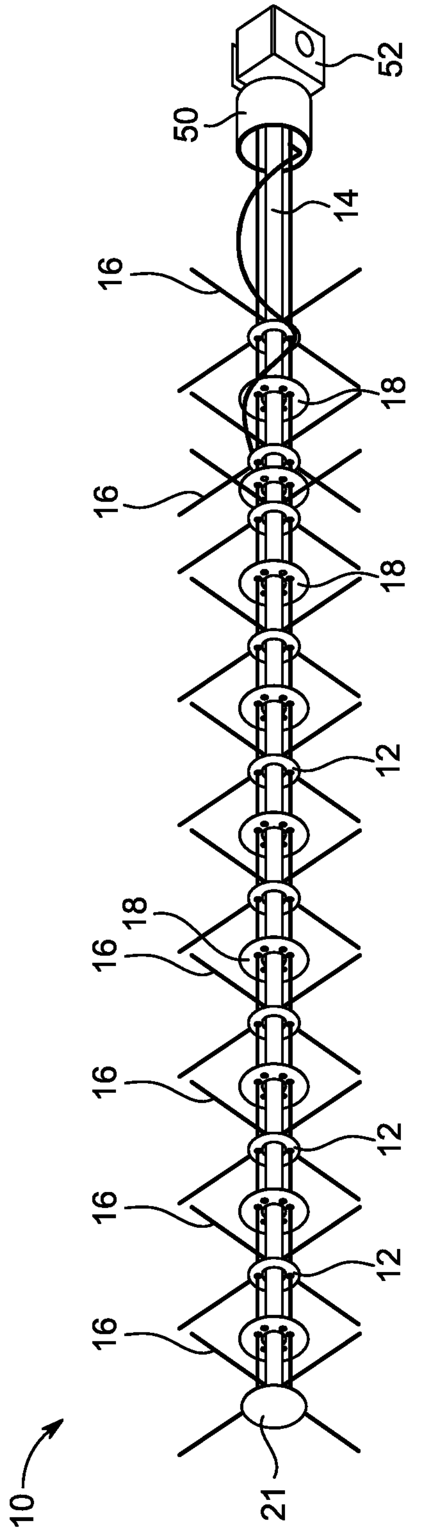
FIG. 1 illustrates a fully deployed antenna with a core board array disposed on a central boom.

FIG. 1 illustrates a deployed array antenna 10 with a plurality of core boards 12 each defining a central aperture through which a central boom 14 passes. Certain ones of the core boards 12 carry antenna elements 16 and associated electronic components; other core boards carry sensors for measuring various conditions in space. A top core board 21, with different functional aspects than the core boards 12, is also depicted in FIG. 1 and further described herein.

Spacer boards 18 (also referred to as separator boards) are disposed between consecutive core boards 12, each spacer board defining a central aperture through which the boom passes. The spacer boards maintain proper spacing between the core boards (and thus between the antenna elements) and provide stability during deployment and operation. Note that the distance between consecutive core boards may not be equal along the length of the boom. And in fact, the spacing is likely not equal as that distance is determined by the operational requirements of the antennas affixed to the core boards.

Figure 4:
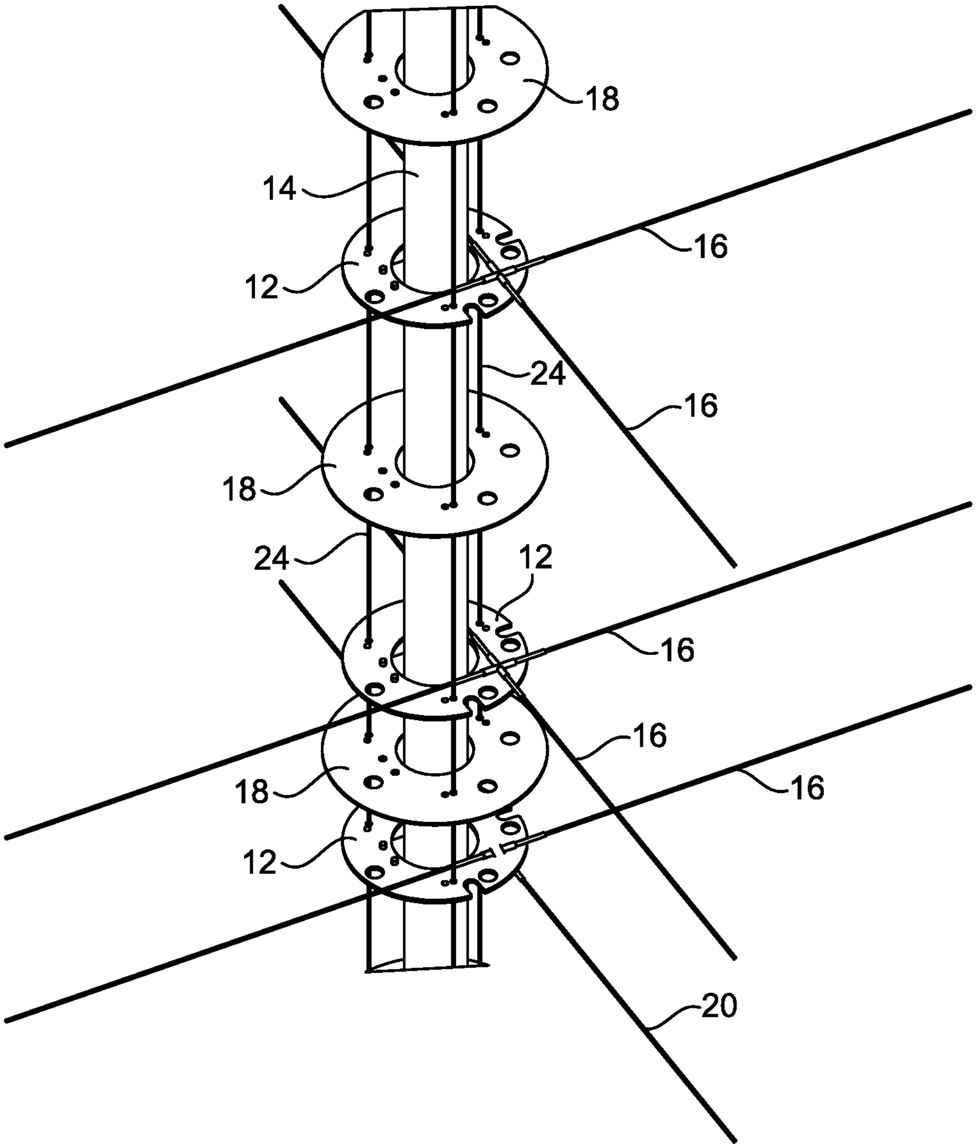
FIG. 4 illustrates core and separator boards with parallel tension cords and edge-mounted antenna elements.
Figure 5:
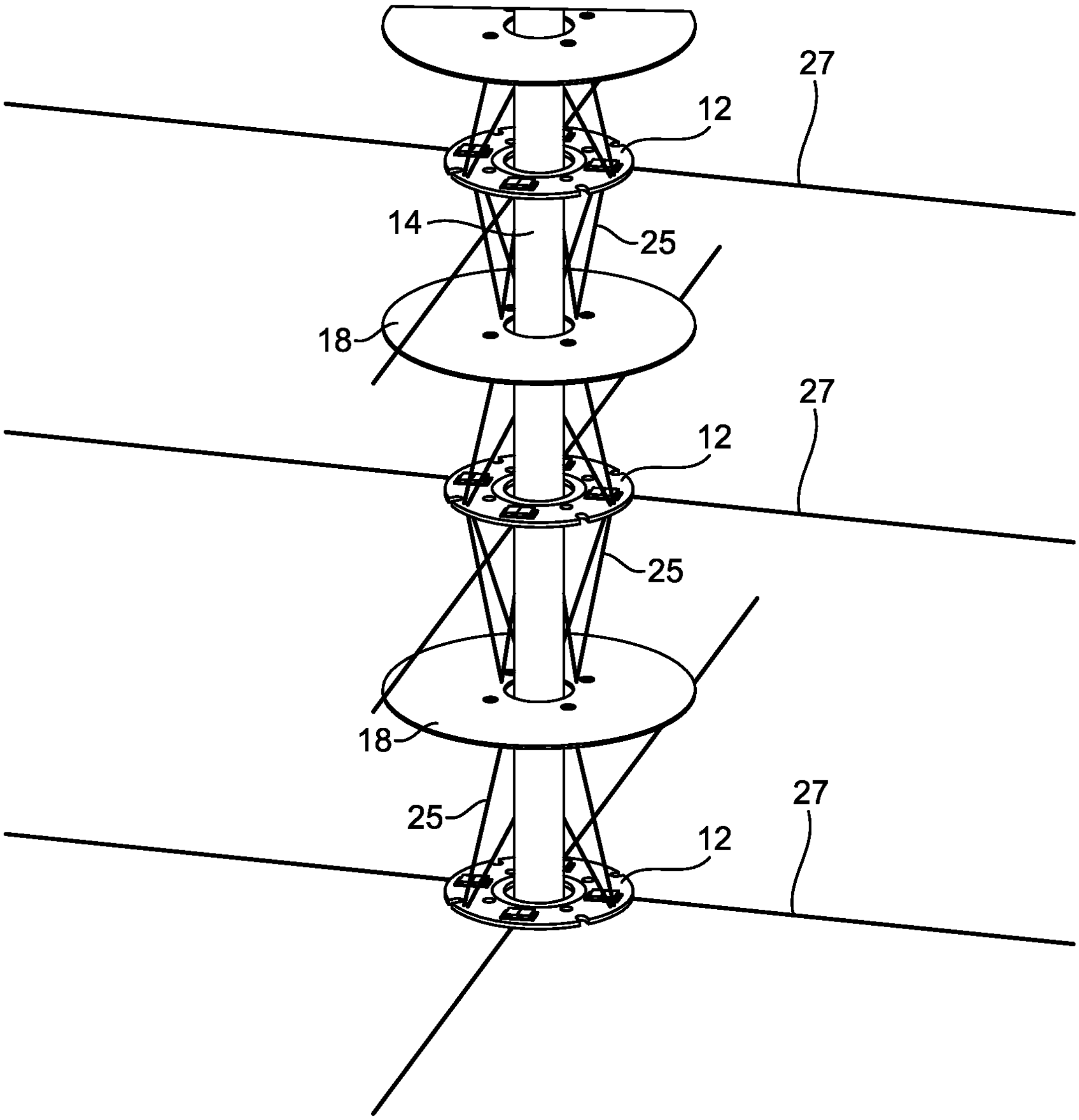
FIG. 5 illustrates core and separator boards with crossed tension cords and center mounted antenna elements.

The close-up view of FIG. 4 depicts parallel alignment and tension cords 24 extending parallel to the central boom 14. FIG. 5 depicts alignment and tension cords 25 configured in a cross-shaped pattern, in lieu of the parallel alignment and tension cords 24 of FIG. 4.

A material of the boom 14 comprises carbon fiber, fiberglass or a composite structure of carbon fiber and fiberglass formed in layers.

The stowing arrangement, the deployment system and the support structure can support various antenna types for space-based communications. Exemplary antennas, some of which are illustrated in the accompanying figures include, but are not limited to: element antennas (e.g., a dipole antenna), antenna arrays (e.g. a Yagi antenna array, a log periodic array that extends across several core boards) and traveling wave antennas (e.g. a helical antenna). Certain antenna types are referred to herein, but these are not intended to limit the scope of the invention as set forth in the claims.

The antenna element(s) disposed on a single core board can operate as a single antenna, independent from the other antenna elements disposed on other core boards and supported by the support structure. Use of the term 'array' may be misleading, as the term "array" herein refers to multiple antenna elements extending across a plurality of core boards and cooperatively operating as a single antenna (i.e., a single multielement antenna), thus requiring only a single signal feed (e.g., a coaxial cable).

The antenna support structure comprises the one or more core boards 12, the one or more spacer boards 18, the boom 14, the top core board 21, and the alignment and tension cords 24 or 25.

The distance between each element of the antenna array (as attached to its respective core board) is fixed along the antenna boom to ensure required antenna performance is obtained. This fixed distance is maintained by the distance (spacing) between the core boards, which is in turn determined by lengths of the tension cords between the core boards when the boom is fully deployed and the cords are tensioned.

The spacing of the elements in a Yagi antenna, for example, is critical for the antenna to provide sufficient gain and satisfy other antenna performance objectives. The core boards are spaced to meet these operational requirements for a given frequency of operation and antenna element type and maintained at that spacing during operation by the tension cords.

In addition to physically supporting the antenna elements and providing the coaxial or wire feeders interconnects for these elements, the core boards carry stand-alone or integrated sensors, active and passive electronic components, and printed circuit board circuit pads, tracks, and interconnects for these components that operate in conjunction with the antenna elements and provide the required antenna and sensor functionality to ensure the mission objectives are satisfied.

For example, hybrid couplers and balun matching transformers, can be mounted on a core board with electrical tracks and pads formed thereon to interconnect and support other components on the core board and the antenna elements connected to that core board. Interconnects with components on other core boards in the array can also be provided by conductive wires or coaxial cables between core boards.

In a preferred embodiment, each core board 12 comprises a G10, FR4, Teflon® (a registered trademark of Chemours Company of Wilmington, DE) or another copper-clad printed circuit board material on which electrical interconnects can be formed by machining or etching the copper cladding. After etching or machining, the remaining copper cladding functions as conductive metal traces or tracks that form circuit interconnects. Multi-layer core boards with buried patterned conductive traces can also be used.

As known by those skilled in the art, the core boards may comprise a layer of another conductive metal in lieu of copper. This conductive material can also be etched or machined to form the interconnects.

Figure 2:
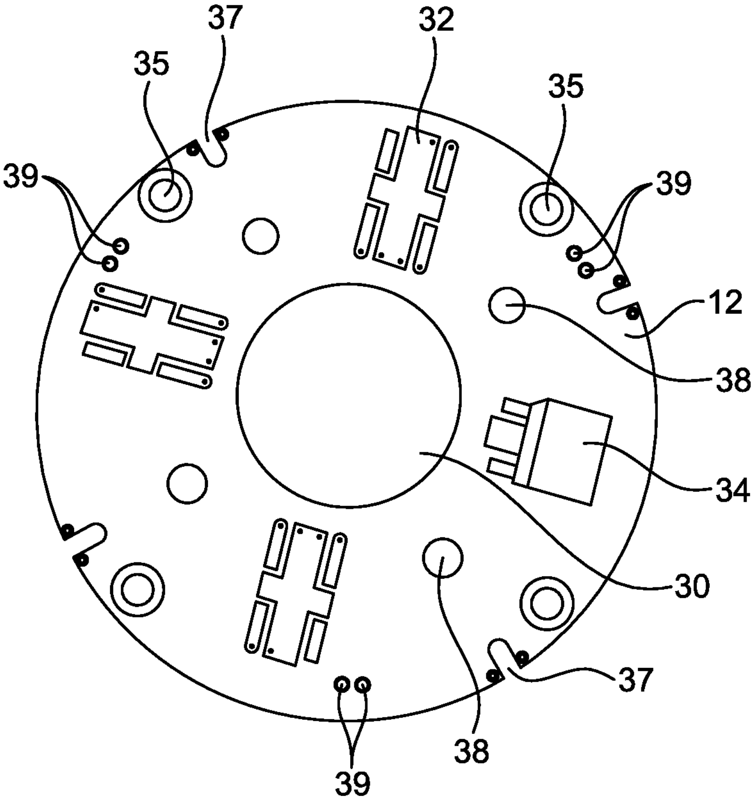
FIG. 2 illustrates a view of a core board, with components, constructed according to the teachings of the invention.

FIG. 2 illustrates a single core board 12 that defines a central aperture 30 through which the boom passes. The boom is not attached to the core boards along the length of the boom, but is attached to the top core board as described in detail herein. The illustrated board also includes solder pads 32 and an attached electronic component 34, which in one application may be a sensor for measuring a space-based parameter, such as magnetic, electrical, or plasma fields.

Conductors extending between core boards pass through the other openings 35 and slots 37 depicted in the core board 12. Four openings 38 receive stow pins when the antenna support structure is in a stowed configuration, as further described below.

The core board 12 of FIG. 2 illustrates a universal core board that can support different antenna types, multiple electronic components, and defines openings for conductors passing between core boards.

Each core board is sized (e.g., diameter) and shaped (circular, square, or another configuration) according to the application.

Each core board, except the top-most core board 21, defines the central aperture 30 (see FIG. 2) for receiving the deployable boom 14 (see FIG. 1). Thus, the aperture size is selected to accommodate the boom diameter. Except for the topmost core board 21, the core boards 12 are not attached to the boom 14. Instead the boom passes freely through the central aperture in each board. As the boom is deployed or extended from the stow tube the boom carries the core and spacer boards with it, due to the tension cords that interconnect the top board, the boom, and the remaining core and spacer boards. The boom then serves as a solid structural member to provide stiffness/rigid support during deployment and operation.

The tension cords are affixed to regions 39 with an epoxy or another space rated adhesive. These regions are illustrated as conductive openings, but that configuration is not necessarily required. Also, more or fewer than the six illustrated regions 39 may be employed in any embodiment.

Figure 3:
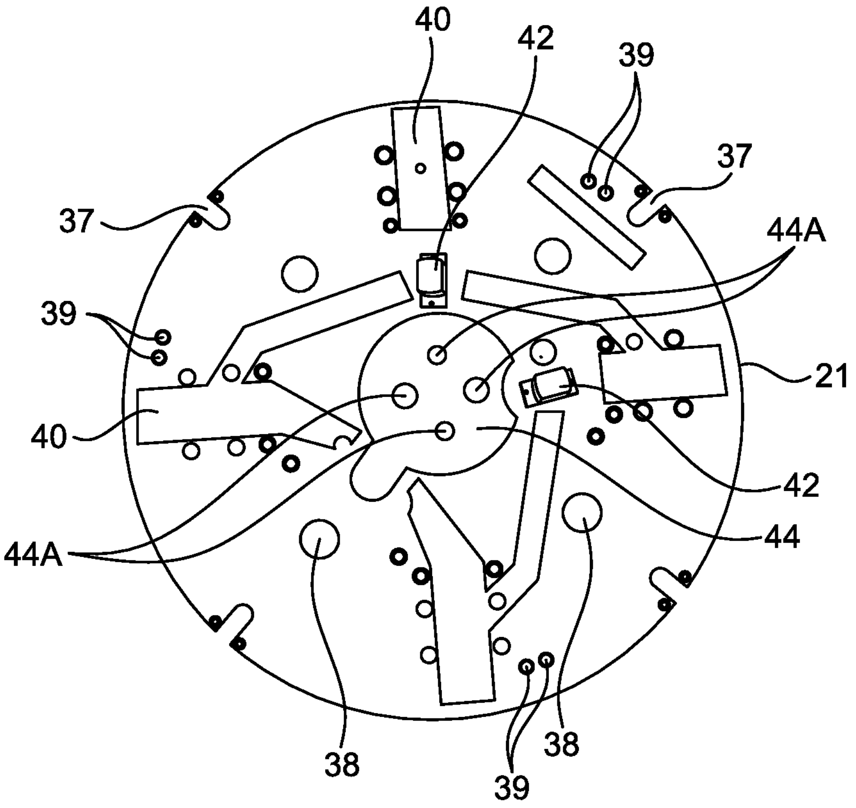
FIG. 3 illustrates a view of the top core board, with components, constructed according to the teachings of the invention.

FIG. 3 illustrates the top core board 21 with printed circuit interconnects 40 and components 42. The top core board, lacking a central aperture, is attached to the top end of the boom 14 (see FIG. 1), and serves as a fixed anchor for tensioning all the core boards mounted on the boom as the boom is deployed, as described further herein. The boom is attached to a region 44 of the top core board 21.

A round dowel of Teflon© (a registered trademark of Chemours Company of Wilmington, DE), fiberglass or Delrin® (a registered trademark of E. I. du Pont de Nemours and Company of Wilmington, DE or one of its affiliates), or other space rated material, is inserted into the top end of the boom. The boom is 'C' shaped in cross section and thus the dowel can be inserted into the boom through the open 'C'. Screws (or another fastening element) are inserted into holes in a side of the boom. These holes align with tapped holes in a side surface of the dowel. Thus, the screws secure the dowel into the boom. Mounting holes are also tapped into the top surface of the dowel, and these holes are aligned with holes 44A in the top core board 21. Screws (or another fastening element) are inserted into the holes in the top core board down into the holes in the top surface of the dowel to secure the top core board to the boom.

As further described, the boom is stored in a flat configuration and forms into the 'C' shape immediately as deployed. A 'C' shaped structure, such as the boom, has greater shear strength than a simple flat structure or a closed structure, such as one having a round or oval cross section.

FIG. 4 again illustrates the flexibility of the present invention in that different antenna types can be attached to a core board and elements of antenna arrays can be attached to several core boards or mounted around the perimeter of the core boards as required to meet the antenna performance requirements. For example, the three antennas identified by reference numeral 16 form a Yagi antenna array. Note also that two elements of the lowest-mounted antenna 16 are connected to a bottom surface of the core board and two elements are connected to the top surface, again illustrating the flexibility of the core boards and antenna elements.

Alternatively, a pair of the antennas 16 in FIG. 4 can be operated independently as a turnstile antenna.

FIG. 5 illustrates three crossed antennas 27 each one connected to a core board. Crossed tension cords 25 are also depicted. Note that the antenna elements in FIG. 5 are connected to their respective core boards in a different configuration than the antenna elements of FIG. 4. That is, the elements of FIG. 5 exemplify a different type of array antenna than the elements of FIG. 4.

Figure 6:
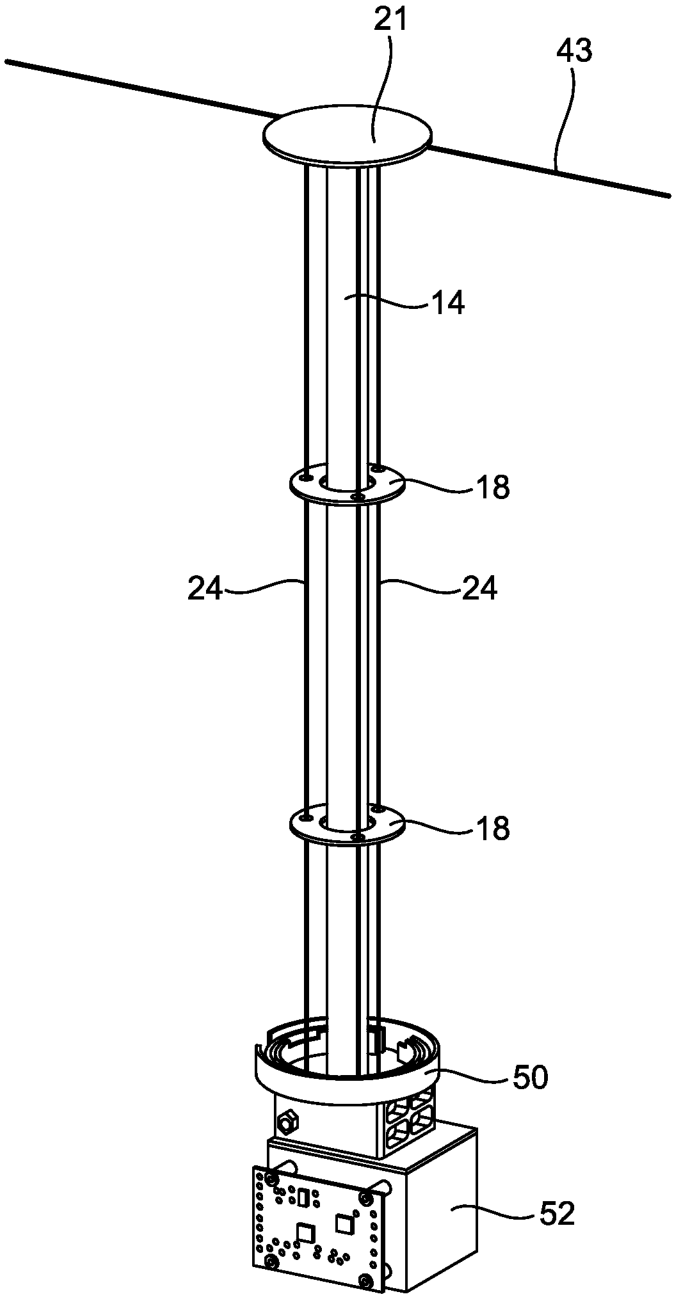
FIG. 6 illustrates a deployed dipole antenna.

FIG. 6 illustrates a deployed dipole antenna 43 attached to the top core board 21. In this embodiment the support mechanism comprises a bottom and a mid-boom spacer board 18. As described further herein the top core board 21 provides mechanical stability by tensioning of the tension cords 24.

Figure 7:
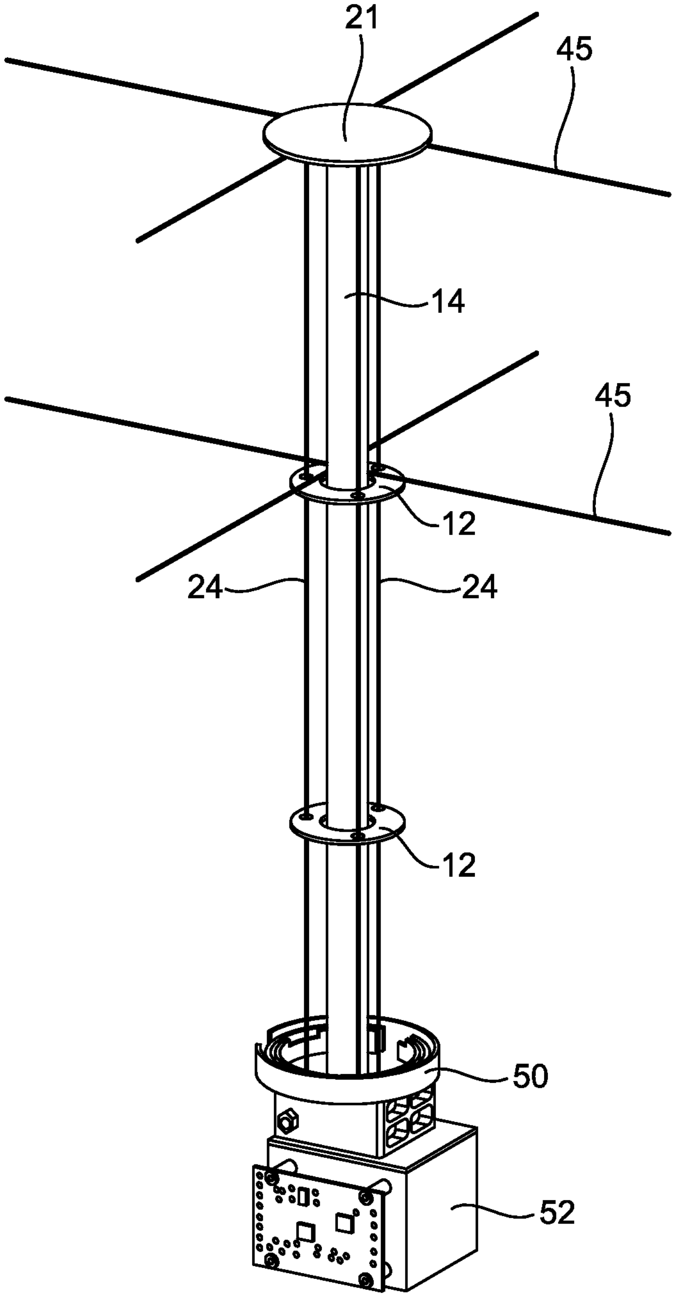
FIG. 7 illustrates a deployed turnstile antenna.

FIG. 7 illustrates a turnstile antenna array 45 with elements connected to the top core board 21 and the core board 12.

Figure 8:
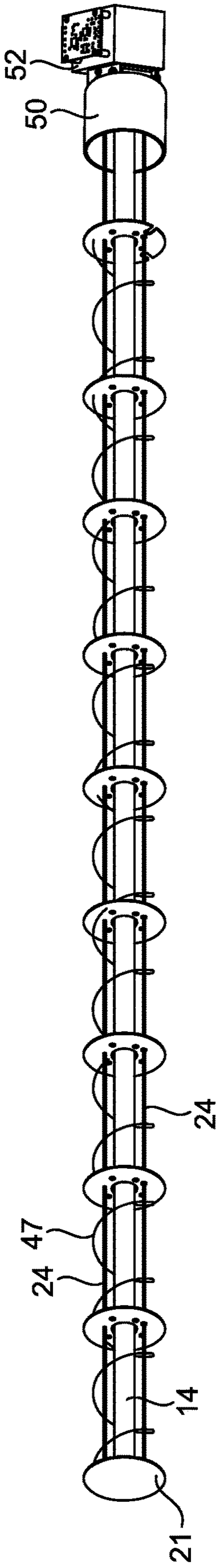
FIG. 8 illustrates a deployed helical antenna.

FIG. 8 illustrates a helical antenna 47 extending helically along the boom 14 from the stow tube 50 to the top core board 21. Like all the antennas referred to herein, the dimensions (diameter, length, filar spacing, etc.) of the helical antenna are selected to meet applicable performance requirements.

In an embodiment that requires the antenna to rotate about the boom during deployment, such as with the helical antenna 47 of FIG. 8, a bearing is disposed between the top core board and the dowel (the dowel inserted into the open end of the boom as described herein) to provide free movement of the core boards and the top core board (all core boards are connected together by the tension cords) around the boom.

In an embodiment where any twist in the boom needs to be removed to ensure the deployed boom is straight along its length and the attached antennas are aligned and correctly positioned, the bearing described immediately above is rotated so that the core boards and the top core board are rotated relative to the boom. The rotational force is provided by tensioning the cords along the length of the boom. As the cords are tensioned, by application of a force on the bottom core board, the core boards rotate around the boom and are pulled into alignment by the tension cords running parallel to the boom. The initial tension force on the tension cords is measured prior to applying additional tension forces.

Figure 9:
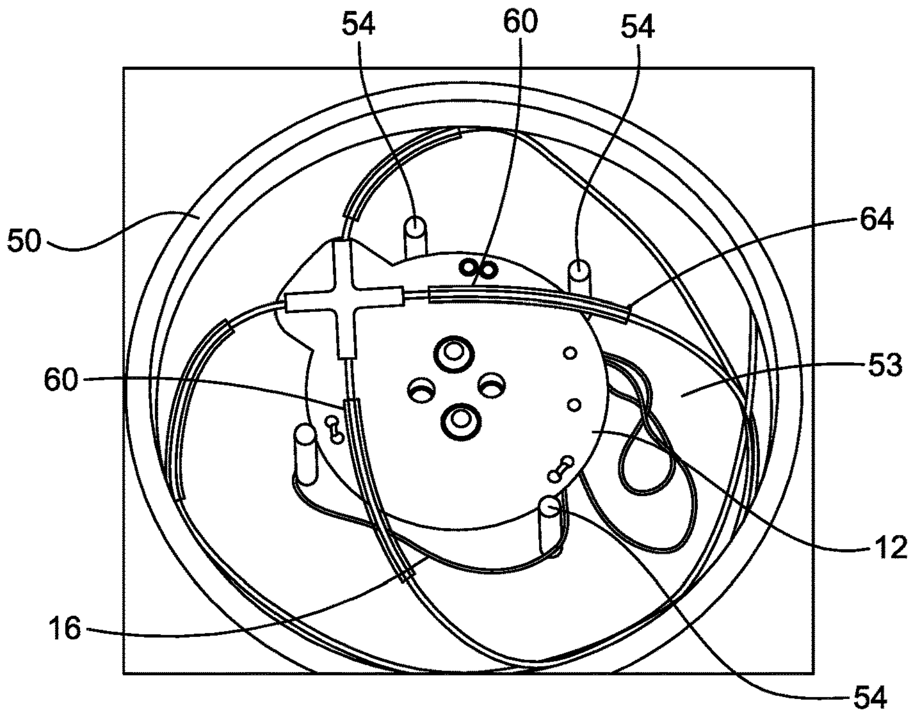
FIG. 9 illustrates system elements in a stowed configuration inside a stow tube.

The longitudinal boom-like structure, comprising the core boards, spacer boards and the boom (see FIG. 1) is stowed within a stow tube 50 during launch. FIG. 9 depicts an interior view of the stow tube with the elements stowed therein. The lowest (or first) core board at the base of the boom is attached to an inside surface of the stow tube 50. The tension cords terminate at the lowest core board. Although FIG. 9 illustrates the stow tube as circular in cross section, in other embodiments the stow tube is round, square, oblong, or another form factor or closed-shape as required to accommodate the type, size, and shape of the antenna, boards, sensor, etc.

Figure 11:
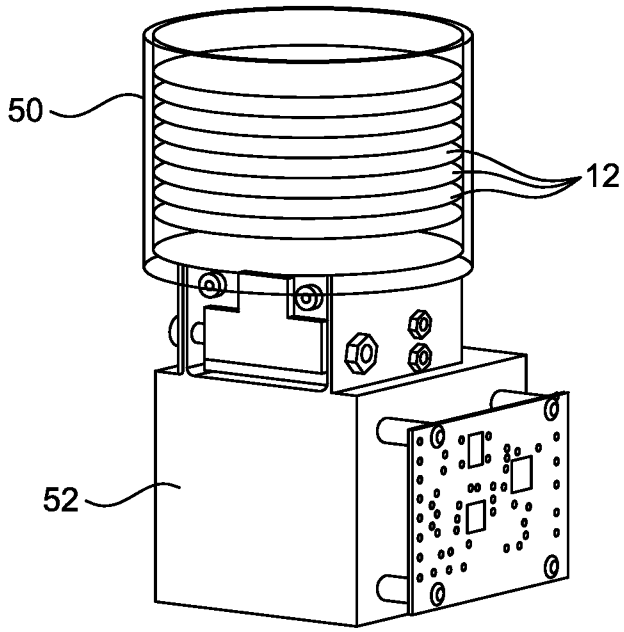
FIG. 11 illustrates a motor-driven deployment mechanism.

The stow tube is mounted on a deployer mechanism 52. See FIG. 11. The deployer mechanism pushes the stowed elements out from the stow tube after the satellite has reached orbit, as further described below.

The separator boards also serve as tension cord guides during deployment; they prevent the tension cords (that are attached to the core boards and terminated at the bottom core board) from snagging and tangling with other tension cords and with the deployment mechanism.

The spacer boards are constructed from the same material as the core boards or from another inert material (such as FR4 or Kydex) that is transparent to radio frequency energy. The core boards, constructed from FR4 or a similar material, are also transparent at radio frequencies.

The core boards and the separator boards are mounted in a longitudinal array, as depicted in FIG. 1, and attached to each other using two, three or more tension cords 24 (comprising a Kevlar material in one embodiment) that are transparent to RF energy. The number of tension cords depends on the diameter of the core boards.

The tension cords are attached to both the spacer boards and the core boards with an epoxy or another adhesive while held in a jig to maintain the required spacing between consecutive boards. The attachment points are indicated by reference character 39 in FIG. 2 (core board) and in FIG. 3 (spacer or separator board). The cords are configured in a parallel orientation between the core and separator boards (see FIGS. 1 and 4) or in a crossed zig-zag configuration (see FIG. 5) to improve deployed stability and stiffness.

Stowed Configuration

When stowed, the core boards and spacer boards are stacked within the stow tube 50, with the top core board holding the stack in place within the stow tube. See FIGS. 9, 10, and 11. The bottom-most board (whether a core or spacer board) is attached to an interior surface of the stow tube.

While stowed, the antenna elements 16 (see FIG. 1), which are constructed of a flexible material, are bent or distorted to fit within the stow tube 50. Additionally, the antenna elements must be correctly located within the stow tube. That is, for an antenna element attached to core board number one, the element(s) must be located between core board number one and its neighbor spacer board number one when stowed. This configuration ensures that when core board number one emerges from the stow tube, the antenna elements attached to core board number one extend out from their stowed position and are correctly located relative to core board number one and spacer board number one.

The flexible or spring-like metallic material of the antenna elements 16 permit the elements to be positioned within the stow tube 50 such that they will return to the proper antenna configuration (e.g., straight) after deployment and release from the stow tube.

Preferably the antenna elements comprise Nitnol, a super-elastic metal alloy that is also used for heart stents. As a medical material, it is not necessary to qualify the Nitnol for spaceflight as it is inert, does not out-gas in a vacuum, and is not affected by proton radiation or atomic oxygen (random oxygen molecules in the vacuum of space that tend to erode satellite surfaces).

Figure 10:
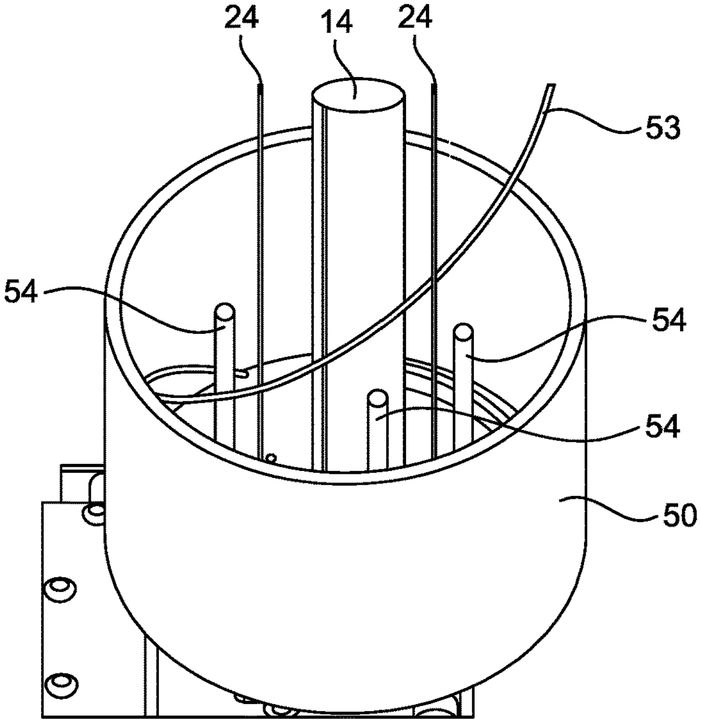
FIG. 10 illustrates an interior of a stow tube absent the boom and system elements.

Stow pins 54 are shown in FIGS. 9 and 10. To ensure there is limited movement of the core and spacer boards after stowing and during the vibration and shock events of launch, all the core and spacer boards, including the top core board, are mounted on two or more stow pins 54 that protrude from the bottom surface of the stow tube and extend to the top core board. The pins retain the stowed stack and also serve as a guide during deployment, thereby ensuring a smooth exit of each core board (and the intervening separator boards) from the stow tube.

Stowed tension cords 24 or 25 are placed proximate the separator boards, that is, near the boom and stow pins 54. At this location, the tension cords are located away from the antenna elements to minimize snagging with antenna elements during deployment. The separator boards also help to prevent snagging of the cords during deployment as the support structure and antenna components emerge from the stow tube 50.

The separator boards are dimensioned to accommodate only a small gap between the circumference of the separator board and the inside surface of the stow tube 50. Thus, when stowed, the elements from one core board cannot interfere or tangle with the elements on the neighboring core boards. The separator boards serve as a barrier between the antenna elements on each core board and maintain the tension cords in an orderly fashion and at a distance away from the antenna elements and other components mounted on the core boards.

The core boards are also dimensioned with a tight tolerance to the inside surface of the stow tube. Thus, there is no space for elements to migrate out of their place above or below their core board location. See FIG. 9.

FIG. 9 also illustrates short sections of clear Teflon tube sleeve, or another space-rated material, 60 disposed over a segment of each antenna element. Preferably, these tube sleeves are placed over the last 2 to 4 inches of each element, that is, two to four inches from the point where the element is attached to the core board. However, the length of the tube sleeve depends on element length.

The tube sleeve also provides some damping of element motion during antenna deployment. Preferably, this damping is advantageous to slow and possibly avoid side-to-side element motion, which would be induced by the sudden release of the element from the stow tube as the elements spring out from their stowed position upon exiting the stow tube. Quick damping is especially required in the vacuum of space. The damping action also settles the antenna elements into their fixed position immediately after deployment and prevents them from interfering with elements that are subsequently deployed.

The damping tube sleeve is held in place over the antenna element with a small bead of epoxy 64 (see FIG. 9) placed at an edge of the tube that is farthest from the core board attachment point.

Deployment

A deployer mechanism 52 (see FIG. 11) is attached to the stow tube 50 and under software control, deploys the antenna structure by moving the boom outward or extended from its stowed position within the stow tube. The boom is stored in a flat configuration around a drum located in the deployer mechanism 52 below the stow tube 50. As the boom unrolls it reforms into a 'C' shape, that is, 'C' shaped in cross section.

As the boom unrolls, the top core board 21 moves out from the stow tube first. Any antenna elements attached to the first core board then deploy outward from their stowed configuration.

As the boom continues to extend from the stow tube, the remaining core boards and spacer boards exit the tube 50, one board at a time.

The tension cords 24 are attached to each core and spacer board and also to the base of the stow tube. The tension cords pull each successive board out from the stow tube during deployment until all of the boards have been extracted.

When the structure has been fully deployed, a tension force is applied to the tension cords to ensure that each of the core boards and each of the antenna elements is correctly spaced to meet the antenna performance requirements.

What is claimed is:

1. An antenna support structure comprising:

a boom;

a plurality of core boards disposed longitudinally along a length of the boom, each core board defining an opening, the boom passing through the opening in the core boards;

one or more spacer boards disposed longitudinally along a length of the boom, each spacer board defining an opening, the boom passing through the opening in the spacer boards;

a top board rotatably affixed to a first end of the boom, the top board comprising a core board;

a bottom board affixed to a base surface of a stow tube, the bottom board comprising a core board or a spacer board;

antenna elements, for sending or receiving signals, mounted to one or more of the core boards, a material of the antenna elements comprising a flexible material allowing the elements to be stowed in a restricted volume of the stow tube prior to deployment from the stow tube into an operational configuration;

tension cords disposed longitudinally along the boom and attached to each one of the plurality of core boards, the one or more spacer boards, the top board, and the bottom board, the tension cords in a tensioned condition to ensure the core boards and the antenna elements thereon are spaced apart as required.

2. The antenna support structure of claim 1, further comprising conductive regions on one or more of the core boards, electronic components or sensors connected to conductive regions, and the antenna elements connected to conductive regions.

3. The antenna support structure of claim 2, wherein the electronic components operate in conjunction with the antenna elements.

4. The antenna support structure of claim 2, wherein the sensors measure parameters related to magnetic, electrical, or plasma fields.

5. The antenna support structure of claim 1, wherein the antenna elements function as independent element antennas, function as array antennas comprising antenna elements on more than one core board, or function as traveling wave antennas.

6. The antenna support structure of claim 1, wherein the tension cords comprise at least two tension cords disposed on opposing sides of the boom.

7. The antenna support structure of claim 6, wherein the tension cords are configured in a parallel orientation relative to the boom between the core and separator or in a crossed zig-zag configuration between the core and separator boards.

8. The antenna support structure of claim 1, wherein the boom is 'C' shaped in cross section.

9. The antenna support structure of claim 1, wherein the antenna elements comprise a helical antenna extending across at least three core boards, wherein segments of the helical antenna are attached to edges of the three core boards, and the at least three core boards are spaced-apart for operation of the helical antenna.

10. The antenna support structure of claim 1, wherein each of the core boards and spacer boards defines a circular shape.

11. The antenna support structure of claim 1, wherein a material of each one of the plurality of core boards, each one of the one or more spacer boards, and each tension cord is transparent to radio frequency energy.

12. The antenna support structure of claim 1, wherein the boom, core boards, spacer boards, antenna elements, and tension cords are retained in a stow tube prior to deployment, and during deployment are released from the stow tube, wherein as the boom deploys from the stow tube the antenna elements emerge from a stowed configuration into an operational configuration.

13. The antenna support structure of claim 12, wherein the plurality of core boards is stacked in a parallel orientation when retained in the stow tube.

14. The antenna support structure of claim 12, wherein a cross section of the stow tube is circular, oval, square, oblong, or another closed shape, and a shape of each core board and spacer board is selected to fit within the stow tube.

15. The antenna support structure of claim 1, wherein the antenna elements comprise one of an element antenna, an array antenna, or a traveling wave antenna.

16. The antenna support structure of claim 1, wherein the antenna elements are mounted to one or both of a top and bottom surface of one or more of the plurality of core boards.

17. A method for deploying an antenna support structure, the method comprising:

stowing a boom in a stow tube in a flat cross section and rolled configuration;

stacking horizontally-oriented core and spacer boards in the stow tube, the boom passing through an opening defined in each core and spacer board, two tension cords attached to each core and spacer board, the two tension cords disposed between each core and spacer board when stacked;

a top board rotatably attached to the boom and attached to the tension cords, the top board at a far end of the boom when the boom is in a deployed condition;

a bottom board attached to an interior surface of the stow tube and attached to the tension cords;

applying a first force to extend the boom, during which the flat cross section transforms to a "C" shaped cross section; and after the boom is extended, applying a second force to the boom, the second force transferred to the top board, thereby tensioning and aligning all the tension cords to properly space and orient all the core and spacer boards along the boom.

18. The method of claim 17, wherein the first and second forces are applied by a deployer mechanism.

19. The method of claim 17, wherein the top board comprises a core board and the bottom board comprises a core board or a spacer board.

20. The method of claim 17, wherein the second force is a twisting force applied to the boom when the boom is in the deployed condition, the twisting force rotating the core boards to position antenna elements attached to one or more of the core boards into an operational condition.

* * * * *